US011269532B2

(12) United States Patent
Shabi et al.

(10) Patent No.: US 11,269,532 B2
(45) Date of Patent: Mar. 8, 2022

(54) DATA REDUCTION BY REPLACEMENT OF REPEATING PATTERN WITH SINGLE INSTANCE

(71) Applicant: EMC IP Holding Company LLC, Hopkinton, MA (US)

(72) Inventors: Uri Shabi, Tel Mond (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 72 days.

(21) Appl. No.: 16/669,172

(22) Filed: Oct. 30, 2019

(65) Prior Publication Data

US 2021/0132836 A1 May 6, 2021

(51) Int. Cl.
*G06F 3/06* (2006.01)
*G06F 9/30* (2018.01)

(52) U.S. Cl.
CPC .......... *G06F 3/0641* (2013.01); *G06F 3/0604* (2013.01); *G06F 3/0608* (2013.01); *G06F 3/0673* (2013.01); *G06F 9/30029* (2013.01)

(58) Field of Classification Search
CPC .... G06F 3/0641; G06F 3/0604; G06F 3/0608; G06F 3/0673; G06F 9/30029
See application file for complete search history.

(56) References Cited

U.S. PATENT DOCUMENTS

| | | | |
|---|---|---|---|
| 9,830,105 B1 | 11/2017 | Tummala et al. | |
| 9,880,743 B1* | 1/2018 | Armangau | G06F 3/0685 |
| 10,037,336 B1* | 7/2018 | Hu | G06F 16/313 |
| 10,514,861 B1 | 12/2019 | Basov et al. | |
| 10,698,608 B2 | 6/2020 | Xiao et al. | |
| 10,789,062 B1* | 9/2020 | Suryanarayana | G06F 3/0641 |
| 10,949,107 B1* | 3/2021 | Basov | G06F 3/0683 |
| 2005/0238126 A1* | 10/2005 | Ribo | H03L 7/0814 375/355 |
| 2015/0347142 A1* | 12/2015 | Godard | G06F 9/30149 712/210 |
| 2017/0123712 A1* | 5/2017 | Li | G06F 11/1453 |
| 2019/0188085 A1* | 6/2019 | Slater | G06F 3/0608 |
| 2019/0220363 A1 | 7/2019 | Zhang et al. | |

* cited by examiner

*Primary Examiner* — Tuan V Thai
(74) *Attorney, Agent, or Firm* — BainwoodHuang

(57) ABSTRACT

A technique for managing data storage begins at a predetermined offset relative to a chunk of data received for writing, and identifies a span of contiguous regions of the chunk that contain identical data. The technique replaces the span of contiguous regions of the chunk with a single instance of a region of the contiguous regions. The technique persistently stores a shortened version of the chunk with the single instance replacing the span of contiguous regions.

19 Claims, 7 Drawing Sheets

DATA REDUCTION BY REPLACEMENT OF REPEATING PATTERN WITH SINGLE INSTANCE

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some data storage systems support data compression for promoting storage efficiency. Compression works by reducing the size of data sets so that they consume less storage space on disk. Compression may be performed in the background or in-line with storage requests.

SUMMARY

Unfortunately, compression is computationally expensive. Given the high costs of performing compression, there is a need for other options for reducing the size of stored data.

To this end, an improved technique performs data matching to reduce the sizes of certain data chunks quickly and efficiently. Starting from a known offset within a chunk, such as its beginning, end, or a designated offset therebetween, the technique identifies a span of repeating data regions and replaces the repeating regions with a single instance of the repeating region. As only the single instance is retained, the overall size of the chunk is reduced. Such size reductions are achieved at low cost in terms of memory and computational resources. In some examples, the technique may achieve further data reduction by compressing the reduced-size chunk. Such compression can be achieved at relatively low cost, as compressing the reduced-size chunk is less computationally expensive than compressing the chunk at its full size. The disclosed technique provides wide-ranging benefits in a storage system, such as reducing processor, memory, and bus access demands. Virtually any operations that a storage system performs on chunks, such as compression, decompression, hash calculations, entropy calculations, and the like, become more efficient when data size is reduced.

Certain embodiments are directed to a method of managing data storage in a computerized system. Beginning at a predetermined offset relative to a chunk of data received for writing, the method includes identifying a span of contiguous regions of the chunk that contain identical data. The method further includes replacing the span of contiguous regions of the chunk with a single instance of a region of the contiguous regions. The method further includes persistently storing a shortened version of the chunk with the single instance replacing the span of contiguous regions.

Other embodiments are directed to a computerized system constructed and arranged to perform a method of managing data storage, such as the method described above. Still other embodiments are directed to a computer program product. The computer program product stores instructions which, when executed on control circuitry of a computerized system, cause the computerized system to perform a method of managing data storage, such as the method described above.

Some examples include receiving a request to read at least a portion of the chunk of data. Such examples include detecting that the shortened version of the chunk is shorter than the chunk of data. Such examples include, in response to said detecting, replicating the single instance of the region to reconstruct the span of contiguous regions. In some examples, the predetermined offset is aligned to an ending boundary of the chunk of data.

In some examples, replacing the span of contiguous regions includes positioning the single instance of the region adjacent to a portion of the chunk of data that borders the span of contiguous regions.

In some examples, replacing the span of contiguous regions is performed based on comparisons between adjacent pairs of regions within the chunk of data. In such examples, the comparisons begin with a pair of regions closest to the predetermined offset and proceed through the contiguous regions. In such examples, the comparisons complete in response to a comparison indicating that a pair of contiguous regions fails to match.

Some examples include performing the comparisons between adjacent pairs of regions based at least in part on an exclusive OR operation. In some examples, the contiguous regions are of equal size.

Some examples include performing compression on the shortened version of the chunk including the single instance of the region. In such examples, the compression results in a compressed version of the chunk. Some examples include reconstituting the chunk, in response to receiving the compressed version of the chunk, by performing decompression on the compressed version of the chunk.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique performs data matching to reduce the sizes of certain data chunks quickly and efficiently. Starting from a known offset within a chunk, such as its beginning, end, or a designated offset therebetween, the technique identifies a span of repeating data regions and replaces the repeating regions with a single instance of the repeating region. As only the single instance is retained, the overall size of the chunk is reduced. Such size reductions are achieved at low cost in terms of memory and computational resources. In some examples, the technique may achieve further data reduction by compressing the reduced-size chunk. Such compression can be achieved at relatively low cost, as compressing the reduced-size chunk is less computationally expensive than compressing the chunk at its full size.

Figure 1:
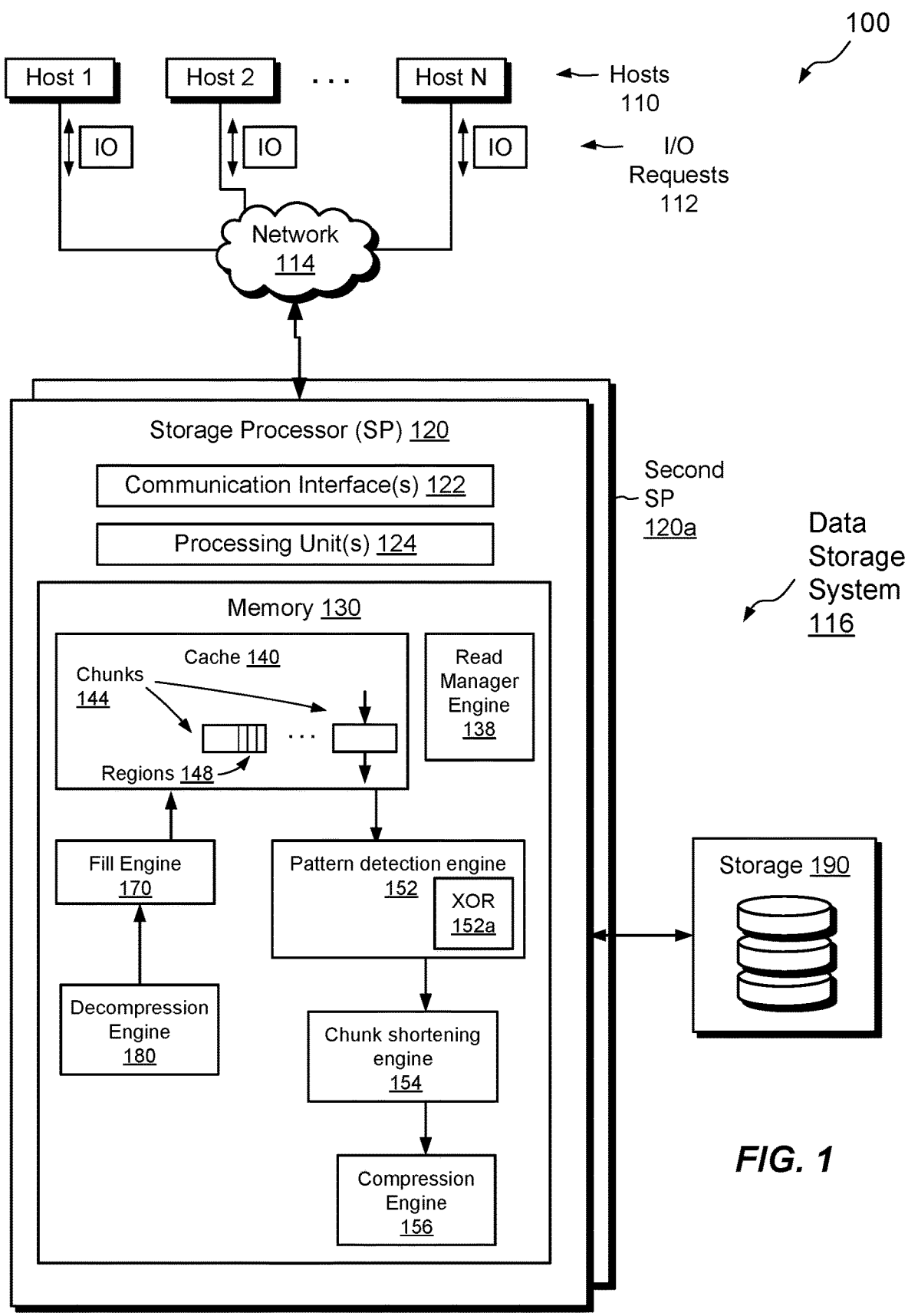
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a read manager engine 138, a cache 140, a fill engine 170, a decompression engine 180, a pattern detection engine 152, a chunk shortening engine 154, and a compression engine 156. Data in cache 140 may be represented by one or more chunks 144, each chunk 144 having a plurality of regions 148. In some examples, the regions 148 within the chunks 144 may be of "N" bits or bytes, where "N" is an integer number equal to or greater than one. In some examples, the regions 148 are of equal size. In some examples, the equal-sized regions 148 within the chunks 144 may be 1, 2, 4, 8, or 16 bytes in length; however, the regions 148 may be of any size.

In example operation, the hosts 110 issue IO requests 112 (e.g., writes and reads) to the data storage system 116. The SP 120 receives the IO requests 112 at the communication interfaces 122 and initiates further processing.

Over the course of one or more writes of the IO requests 112, the cache 140 may accumulate multiple chunks 144 of data. In an example, the pattern detection engine 152 retrieves a chunk 144 from the cache 140 and performs data matching within the chunk 144, starting from a known offset within the chunk 144, such as a beginning, end, or designated offset therebetween. The pattern detection engine 152 compares the value of the region 148 closest to the known offset with the value of an adjacent region 148 within the chunk. Assuming a match is found, the pattern detection engine 152 continues comparing adjacent regions 148, identifying a span of adjacent (contiguous) regions 148 of the chunk 144 that include the same pattern. Eventually, a pair of adjacent regions 148 is found to not match, and the end of the span of adjacent regions is determined. In an example, comparisons of regions 148 may be performed using an exclusive OR operation from XOR component 152a of the pattern detection engine 152. In some examples, the pattern detection engine 152 provides the chunk 144 along with information identifying the span of regions to the chunk shortening engine 154.

In some examples, the chunk shortening engine 154 reduces the chunk 144 to a shortened version of the chunk 144 by replacing the repeating regions of the same pattern with a single instance of a region 148 having the pattern. For example, if the regions 148 are each 8 B long and the span of adjacent regions is 1 kB, the chunk shortening engine 154 replaces the 1-kB span with a single 8-B region. In some examples, the region 148 selected as the single instance is the region 148 of the span farthest from the predetermined offset, i.e., closest to the location at which the repeating pattern ends.

In some examples, the compression engine 156 compresses the shortened version of the chunk provided by the chunk shortening engine 154 into a compressed version of the chunk. After compression, the SP 120 stores the compressed version of the chunk in storage 190, or in any other suitable location.

At some later time, the data storage system 116 receives a read request of the IO requests 112. Here, the read request specifies a read of the previously stored chunk 144, or some portion thereof. In response to the read request, the decompression engine 180 performs decompression on the compressed chunk, providing a decompressed chunk to the fill engine 170.

In some examples, the fill engine 170 compares a size of the decompressed chunk 144 to a standard chunk size. For example, the data storage system 116 may store data in chunks having a predetermined size, such as 4 kB, 8 kB, or the like.

The fill engine 170 then detects whether the size of the decompressed chunk 144 is shorter than the standard chunk size. If the decompressed chunk 144 is shorter than the standard chunk size, then the fill engine 170 identifies the decompressed chunk as a shortened version of a chunk that originally contained a repeating pattern. In an example, concluding that the shortened chunk contained a repeating pattern is automatic, based on detecting that the shortened chunk is shorter than the standard chunk size. In this manner, no additional metadata may be needed for describing the repeating pattern. Rather, the fill engine 170 locates the single instance of the repeating pattern and proceeds to fill the chunk, up to the standard chunk size, with multiple instances of the repeating pattern, thus reconstituting the original chunk 144.

The location at which to insert the repeating pattern into the shortened chunk may be established by design. For example, if the repeating pattern is always at the end of a chunk, then the fill engine 170 reads the last pattern (e.g., the last 8 B) in the shortened chunk and fills in that pattern repeatedly until the chunk reaches the standard size. However, if the repeating pattern is always at the beginning of the chunk, the fill engine 170 reads the first pattern and inserts that pattern repeatedly at the beginning of the chunk, again until the standard size is reached.

In some examples, additional metadata may be used. For instance, if the repeating pattern is located at some intermediate offset between the beginning and the end, the fill engine 170 may reference the metadata to identify the location at which to insert the repeating pattern. Further, in some examples an original size of a chunk may be used, rather than a standard chunk size, for determining whether a chunk being read contains a repeating pattern. In such examples, the fill engine 170 may read the original size of the chunk, determine whether the chunk contains a repeating pattern (based on whether the shortened chunk is smaller than the original chunk size), and fill in the chunk accordingly if so.

Figure 2A:
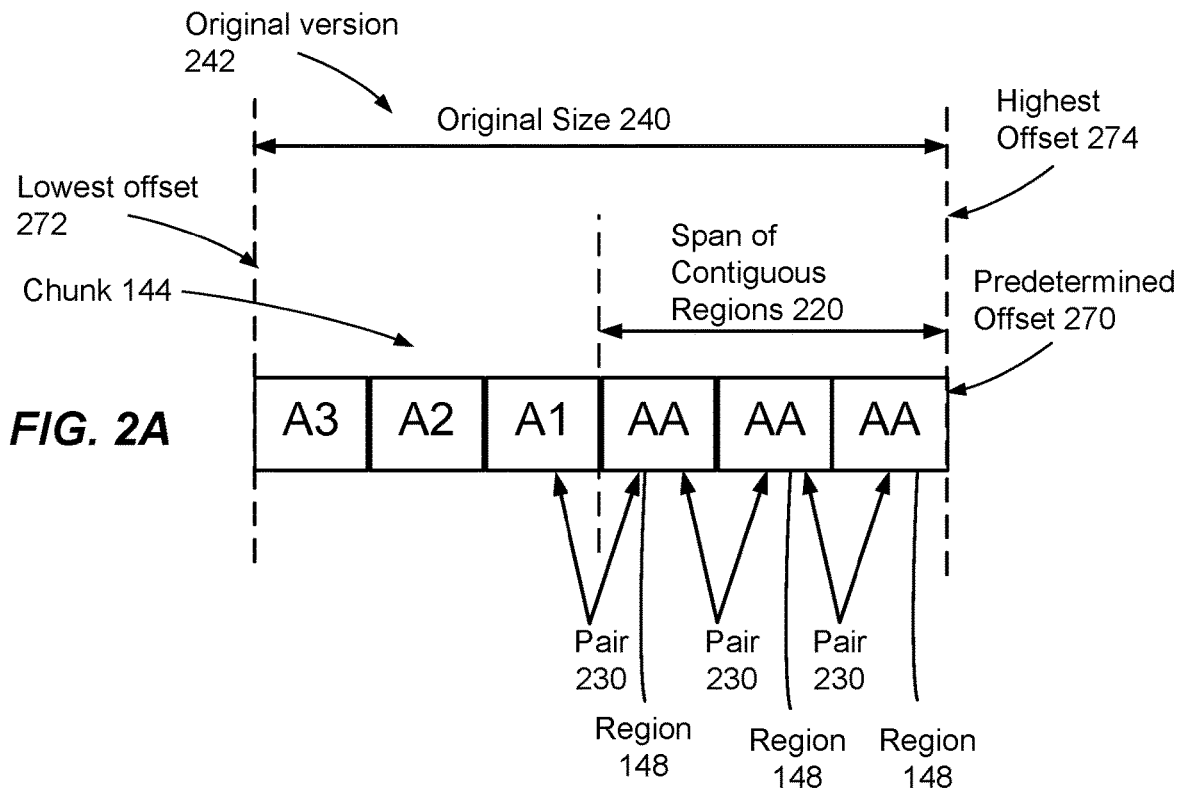
FIGS. 2A-F are diagrams that show example sequences of pattern matching operations.
Figure 2B:
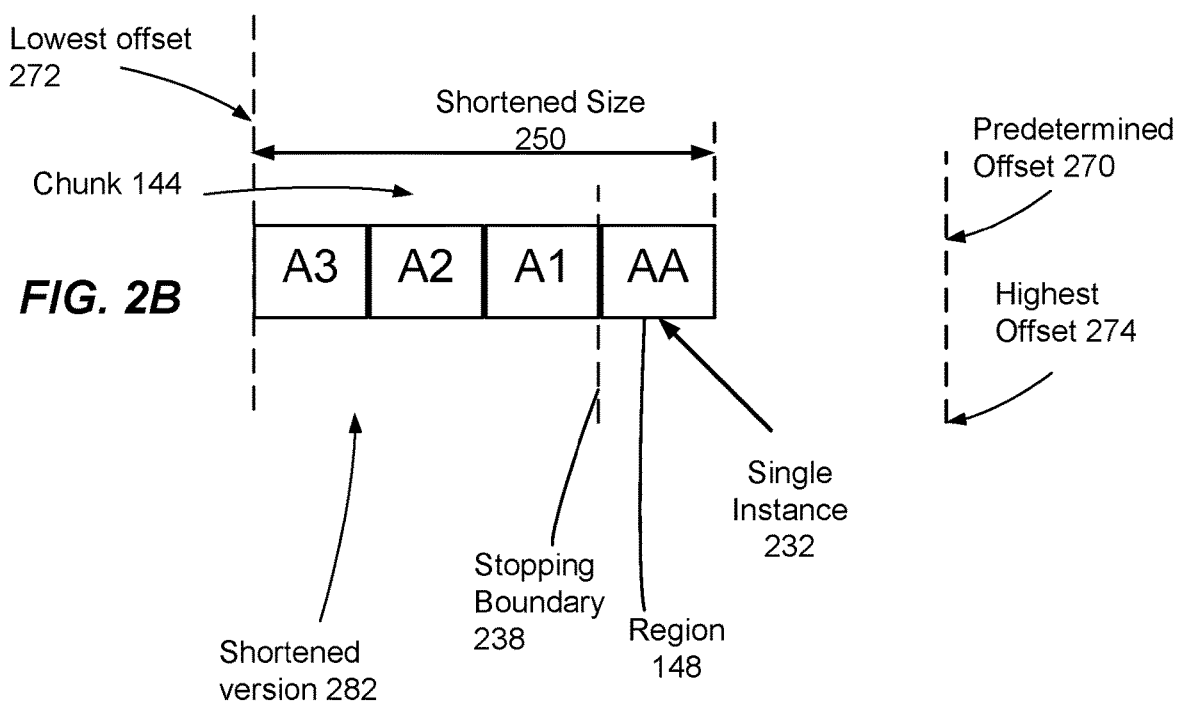
Figure 2C:
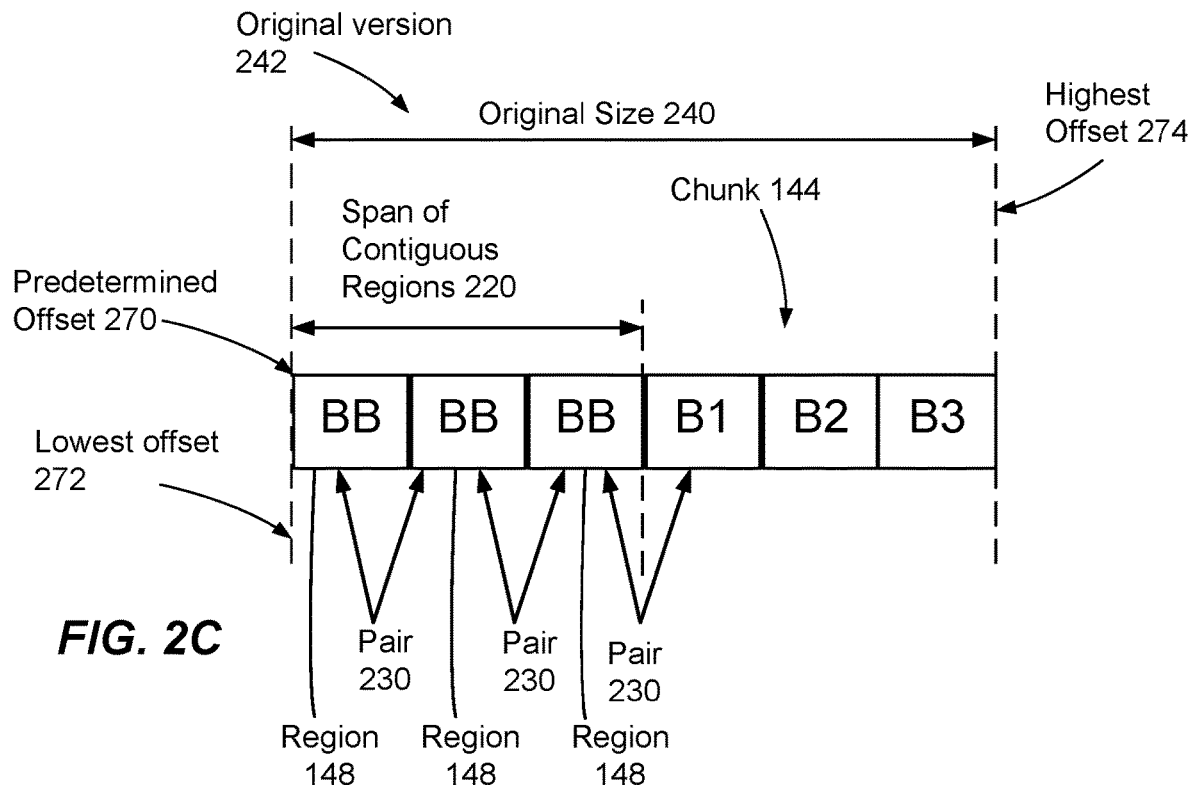
Figure 2D:
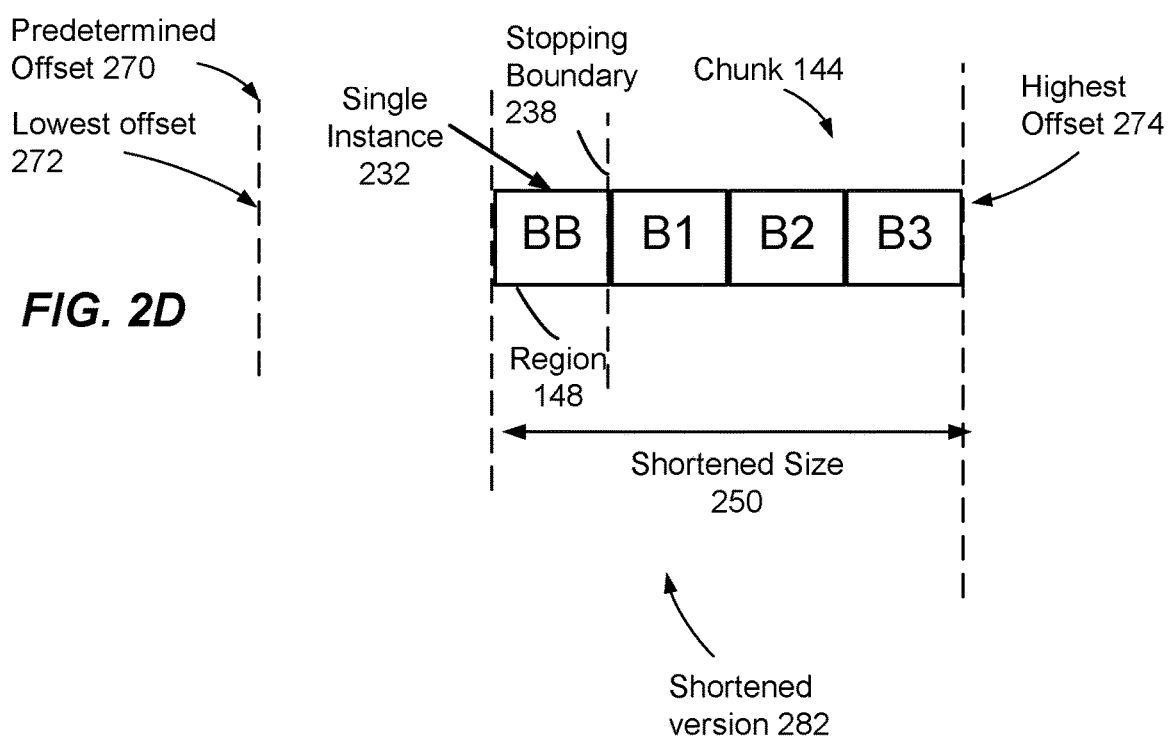
Figure 2E:
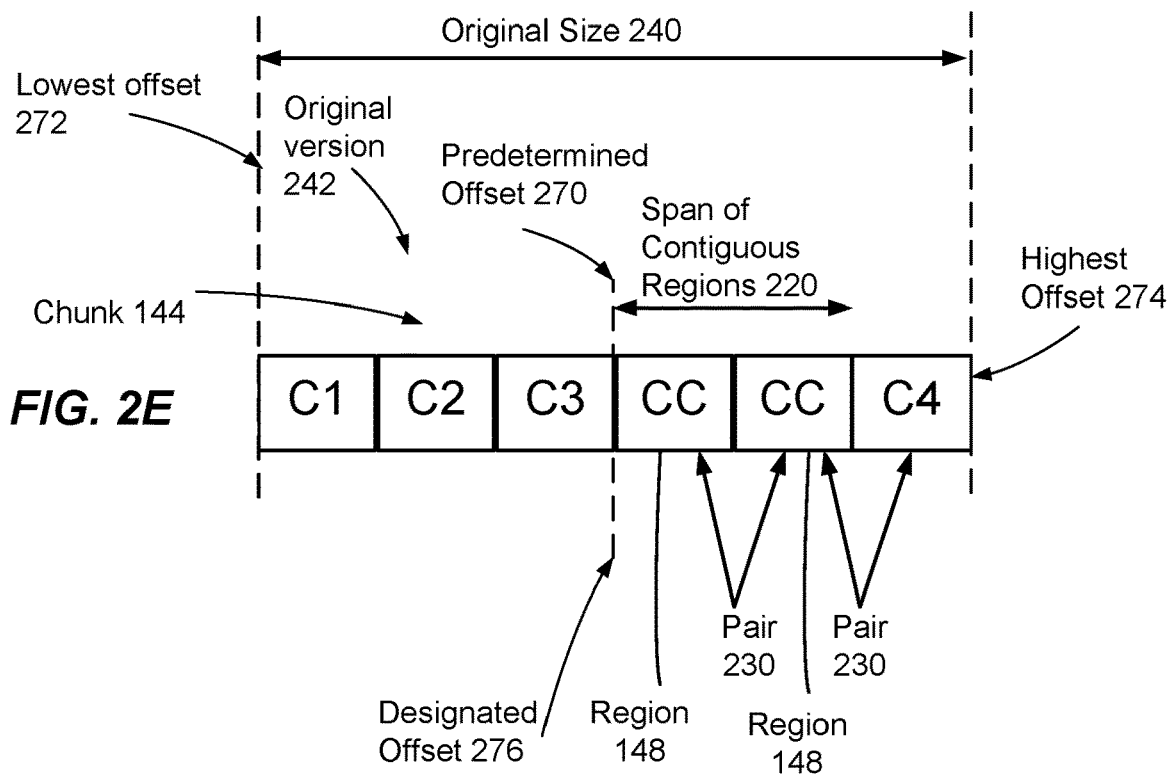
Figure 2F:
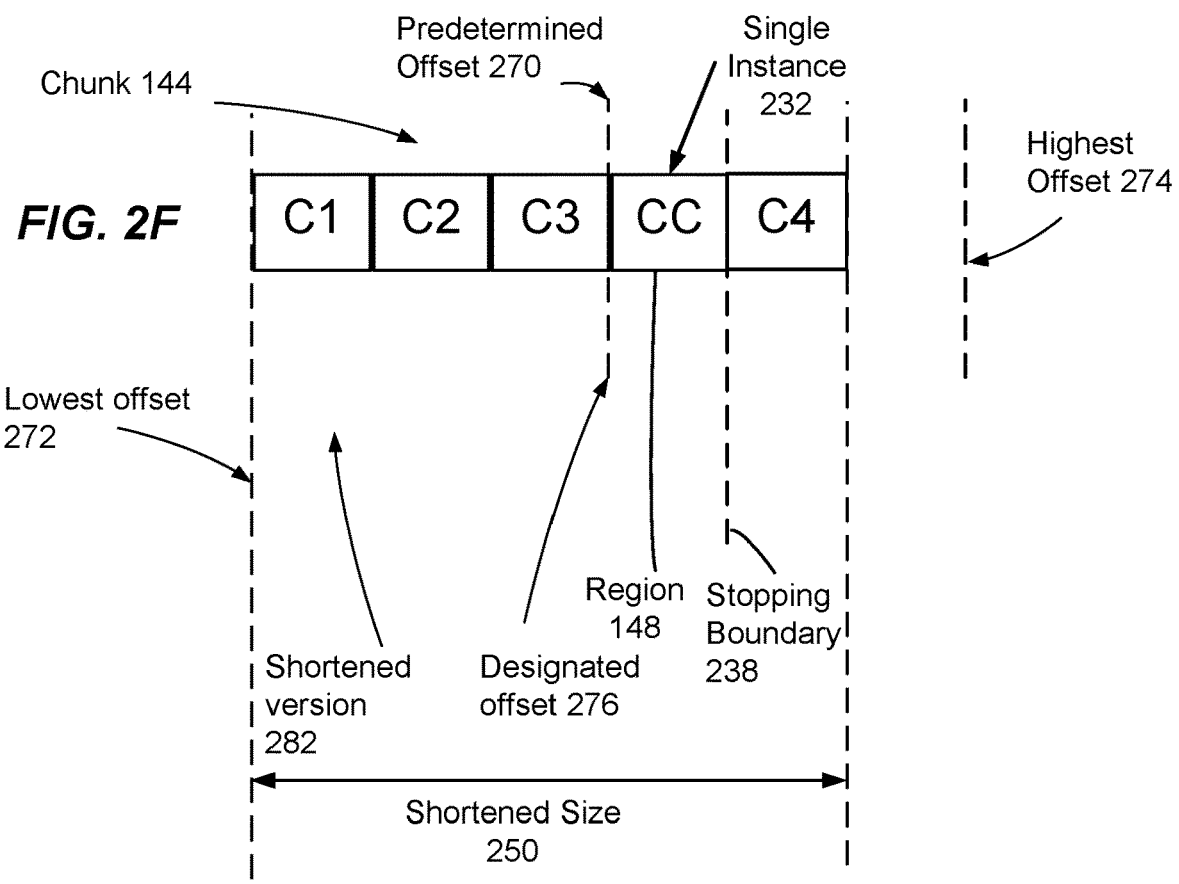

FIGS. 2A-F are diagrams that show example sequences of pattern matching operations. FIGS. 2A, 2C, and 2E illustrate original versions 242 of chunks 144 having original sizes 240 prior to patterns being detected. FIGS. 2B, 2D, and 2F correspond to FIGS. 2A, 2C, and 2E, respectively, and illustrate the resulting shortened versions 282 of chunks 144 after pattern matching operations are performed.

As illustrated collectively in FIGS. 2A-F, after retrieving the chunk 144, the pattern detection engine 152 performs pattern matching of regions 148 within the chunk 144, starting from a known/predetermined offset 270 with the chunk 144, such as a highest offset 272 (FIG. 2A), lowest offset 274 (FIG. 2C), or designated offset 276 (FIG. 2E) therebetween. The corresponding results of pattern matching are illustrated in FIG. 2B for the highest offset 274, in FIG. 2D for lowest offset 272, and in FIG. 2F for the designated offset 276, respectively.

As illustrated collectively in FIGS. 2A-F, in some examples, the pattern detection engine 152 starts comparing pairs 230 of regions starting with the region 148 that is closest to the predetermined offset 270.

In some examples, if the predetermined offset 270 is a designated offset 276 between the lowest offset 272 and highest offset 274, then the pattern detection engine 152 starts with the region 148 that borders the designated offset 276 that is closest to the highest offset 274. This is merely a convention, however.

One skilled in the art would understand how to adapt the example of FIGS. 2E-F so that the pattern detection engine 152 starts with the region 148 that borders the designated offset 276 that is closest to the lowest offset 272.

As illustrated in FIGS. 2A, 2C, and 2E, in some examples, the pattern detection engine 152 proceeds with a comparison through a span 220 of adjacent/contiguous regions 148 of the chunk 144. In such examples, the comparison includes comparing pairs 230 of adjacent regions 148 of the chunk 144 in a contiguous fashion, identifying data of a same pattern within the chunk 144 between each of the pairs 230, until a pair 230 of adjacent regions 148 is found not to match.

In some examples, if the predetermined offset 270 is the designated offset 276 between the lowest offset 272 and highest offset 274, then the pattern detection engine 152 proceeds to compare pairs 230 of regions 148 toward the highest offset 274. In some examples, if the predetermined offset 270 is the lowest offset 272, then the pattern detection engine 152 proceeds to compare pairs 230 of regions 148 toward the highest offset 274. In some examples, if the predetermined offset 270 is the highest offset 274, then the pattern detection engine 152 proceeds to compare pairs 230 of regions 148 toward the lowest offset 272.

In some examples, the pattern detection engine 152 compares pairs 230 of regions 148 based on an exclusive OR operation between the pairs 148, using the XOR component 152. In some examples, the exclusive OR operation compares the bit values of one region of the pair to the bit values of the other region of the pair. If both regions share the same bit values, then the pattern detection engine 152 detects a match between a pair 230 of regions 148. In some examples, the exclusive OR operation may have an XOR truth table as known to one skilled in the art. In some examples, the exclusive OR operation may provide a logic "low" or logic "0" output when regions being compared match, and a logic "high" or logic "1" output when regions being compared do not match.

As illustrated in FIGS. 2B, 2D, and 2F, in some examples, when the pattern detection engine 152 determines that a pair 230 of adjacent regions 148 is found not to match, the pattern detection engine 152 stops comparing pairs 230 of regions 148 at a stopping boundary 238.

As illustrated in FIGS. 2B, 2D, and 2F, in some examples, when the pattern detection engine 152 stops comparing pairs of regions 148, the chunk shortening engine 154 replaces the original version 242 of the chunk 144 having an original size 240 with a shortened version 282 of the chunk 144 having a shortened size 250, by replacing the regions 148 having the pattern with a single instance 232 of a region 148 having the pattern. In some examples, the chunk shortening engine 154 positions the single instance 232 at the region 148 that is adjacent to the stopping boundary 238.

Figure 3:
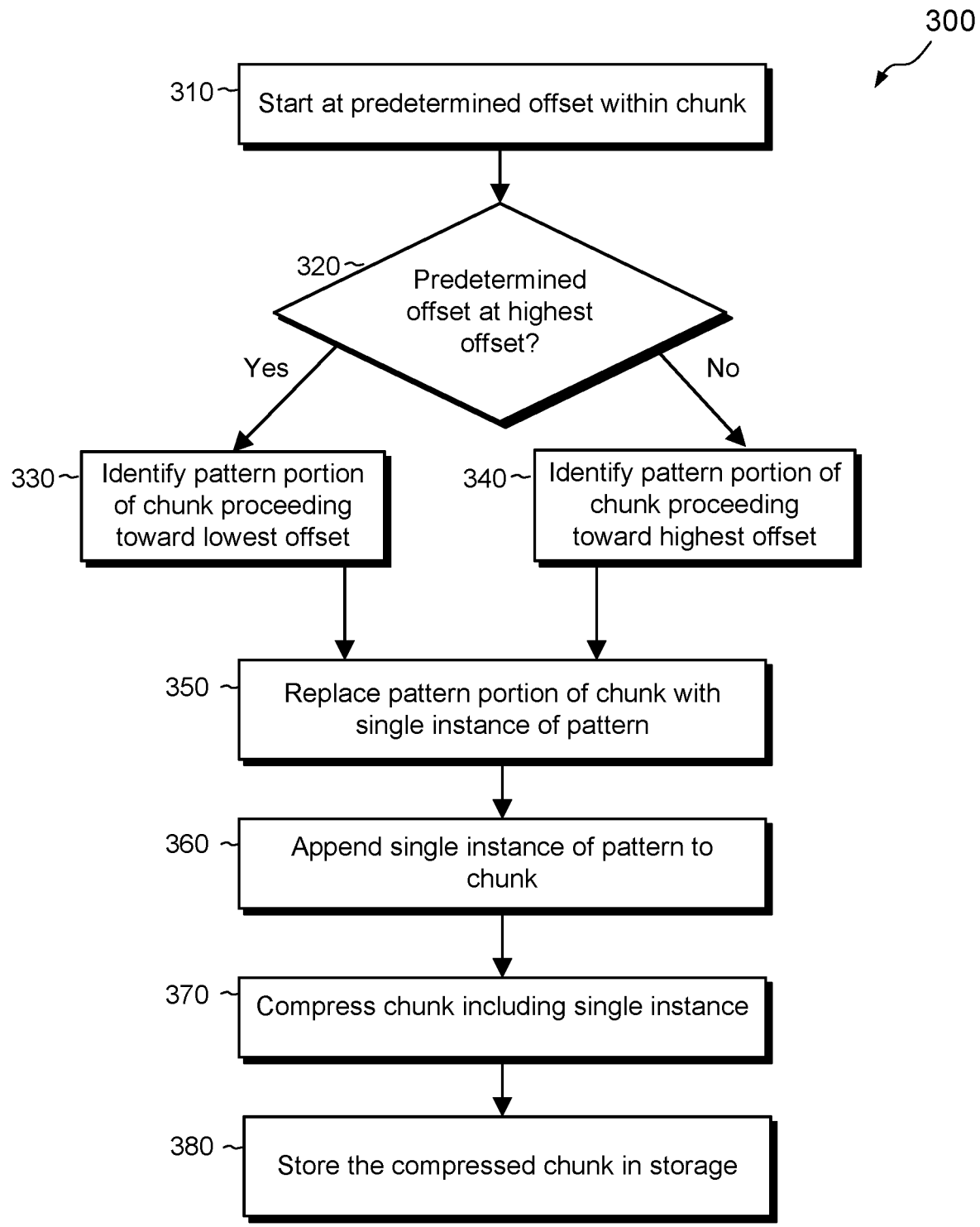
FIG. 3 is a flowchart of a write operation in the context of FIGS. 1-2F.

FIG. 3 is a flowchart of a write operation 300 in the context of FIGS. 1-2F.

At 310, in some examples, on a write operation of the IO requests 112, the pattern detection engine 152 retrieves a chunk 144 being written. After retrieving the chunk 144, the pattern detection engine 152 performs data matching within the chunk 144, starting from a predetermined offset with the chunk 144, such as a beginning, end, or designated offset therebetween.

At 320, in some examples, the pattern detection engine 152 checks whether the predetermined offset is at a highest offset within the chunk 144.

At 330, in some examples, if the predetermined offset is at a highest offset within the chunk 144, then the pattern detection engine identifies a pattern portion of the chunk by identifying contiguous regions 148 of the chunk 144 sharing a same pattern, proceeding with the identification toward the lowest offset within the chunk 144.

At 340, in some examples, if the predetermined offset is at a lowest offset within the chunk 144, then the pattern detection engine 152 identifies a pattern portion of the chunk by identifying all contiguous regions 148 of the chunk 144 sharing a same pattern, proceeding with the identification toward the highest offset within the chunk 144.

At 350, in some examples, after the pattern detection engine 152 completes identification of the pattern portion of the chunk 144, the chunk shortening engine 154 then replaces the pattern portion of the chunk 144 with a single instance of the pattern, the single instance being a region of the pattern portion of the chunk 144.

At 360, in some examples, the chunk shortening engine 154 appends the single instance of the pattern to the chunk 144 by positioning the single instance adjacent to a portion of the chunk 144 that borders the pattern portion of the chunk 144, forming a shortened version of the chunk 144.

At 370, in some examples, the compression engine 156 compresses the shortened version of the chunk 144 including the single instance, forming a compressed version of the shortened version of the chunk 144.

At 380, in some examples, the SP 120 stores the compressed version of the shortened version of the chunk 144 in storage 190, in memory 130, at a location within the SP 120, on host machine 110, and/or another location across the network 114.

Given the example of FIG. 3, one skilled in the art would understand how to adapt the example of FIG. 3 to handle a designated offset 276 within the chunk 144, such as an offset positioned between the highest offset 274 and lowest offset 272.

Figure 4:
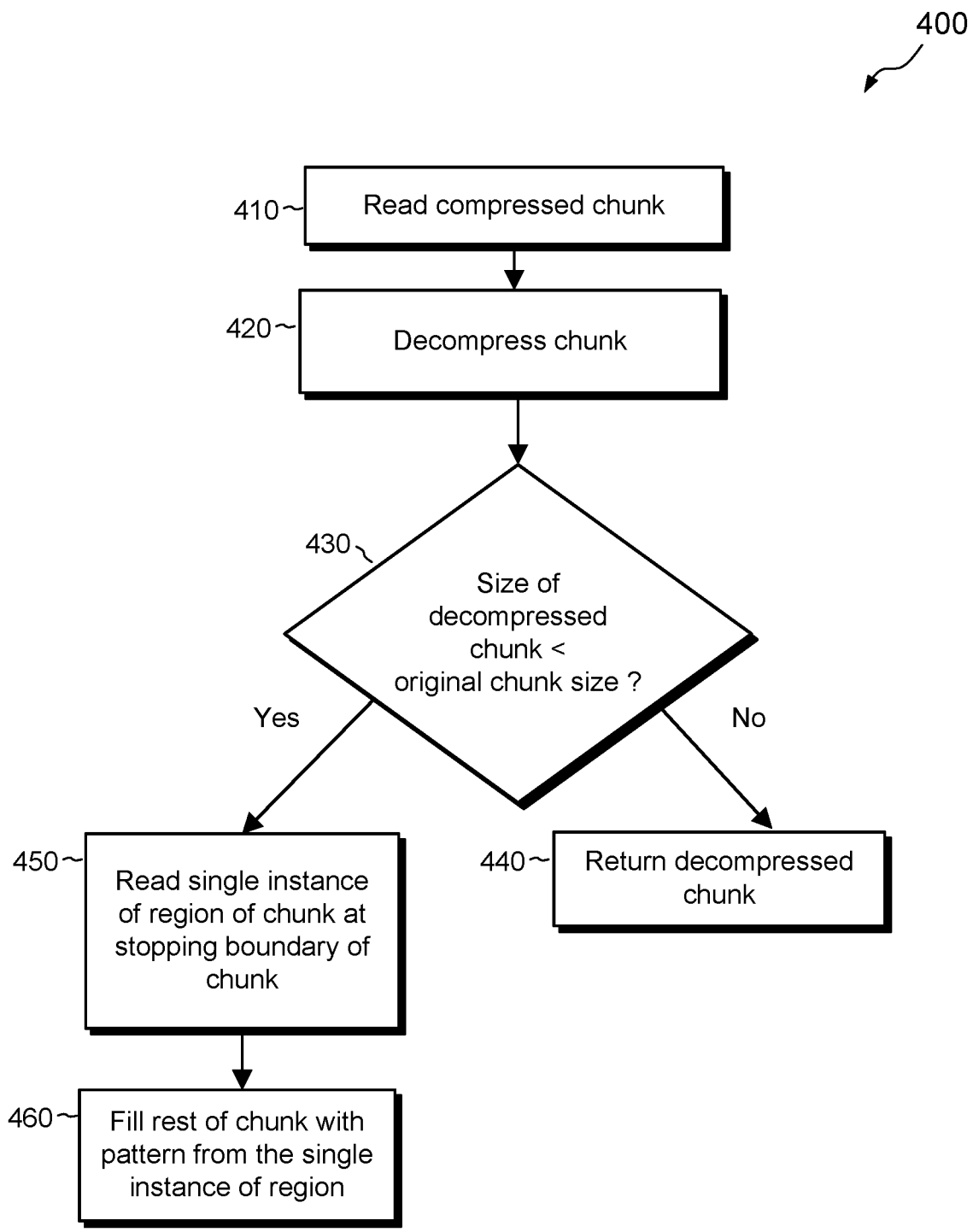
FIG. 4 is a flowchart of a read operation in the context of FIGS. 1-2F.

FIG. 4 is a flowchart of a read operation 400 in the context of FIGS. 1-2F.

At 410, in some examples, on a read operation of the IO requests 112 from a host 110, the SP 120 retrieves a compressed chunk from memory 130, storage 190, and/or a device across the network 114.

At 420, in some examples, the decompression engine 180 performs decompression on the compressed chunk, resulting in a decompressed chunk.

At 430, in some examples, the fill engine 170 compares the size of the decompressed chunk to a standard uncompressed chunk size.

If the fill engine 170 detects that the size of the decompressed chunk is not shorter than the original chunk size (e.g., the size of the decompressed chunk is the same size as the original chunk size), then the fill engine 170 returns the decompressed chunk to the host 110 (440). However, if the fill engine 170 detects that the size of the decompressed chunk is shorter than the original chunk size, then the fill engine 170 considers the decompressed chunk to be a shortened version of the chunk 144.

At 450, in some examples, the fill engine 170 reads a region of the chunk 144 at a stopping boundary of the chunk 144. In some examples, the region being read from the chunk 144 may correspond to the single instance 232 of the examples of FIGS. 2B, 2D, and 2F, respectively. In some examples, the stopping boundary may correspond to the stopping boundary 238 of the examples of FIGS. 2B, 2D, and 2F, respectively.

In some examples, at 450, the fill engine 170 reads and selects a region located at the highest offset of the shortened version of the chunk 144 as being the single instance for filling the rest of the chunk. In some examples, the fill engine 170 may not require metadata to read and select the single instance.

At 460, in some examples, after the fill engine 170 identifies the single instance, the fill engine 170 fills the rest of the shortened version of the chunk 144 with the values from the single instance, until the shortened version of the chunk 144 has a chunk size equal to the original size of the chunk 144.

Figure 5:
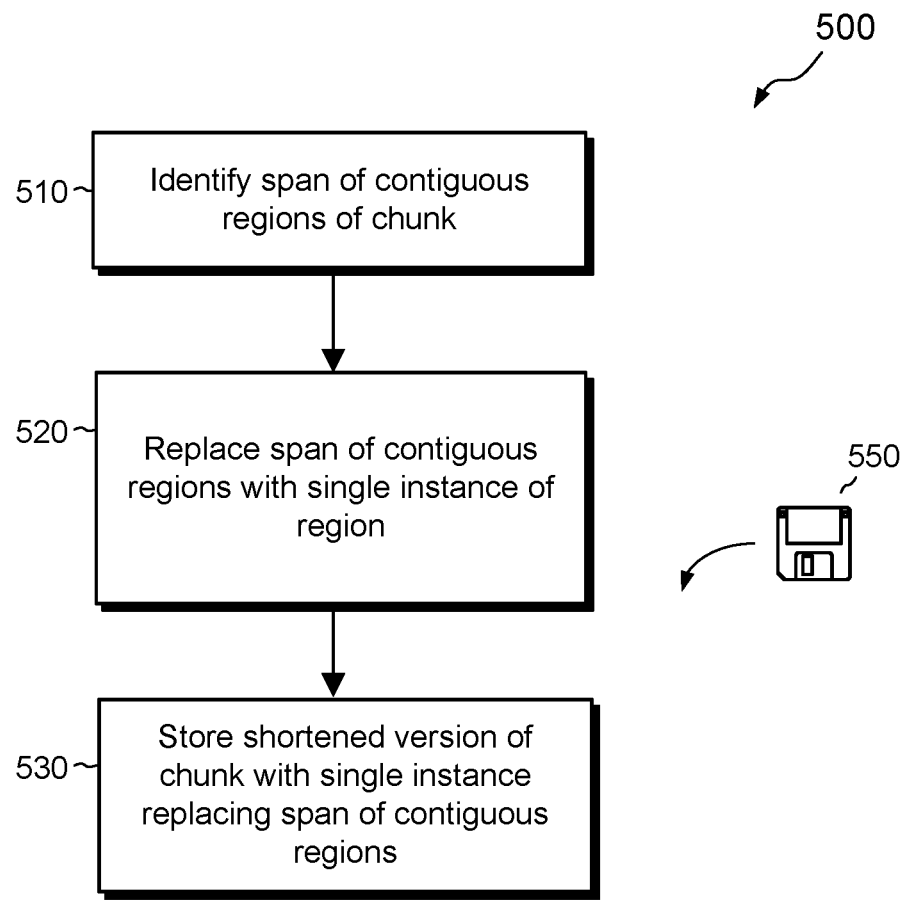
FIG. 5 is a flowchart showing an example method of managing data storage.

FIG. 5 is a flowchart showing an example method 500 of managing data storage.

At 510, the method 500 identifies, within a chunk, a span of contiguous regions.

At 520, the method 500 replaces the span of contiguous regions of the chunk with a single instance of the contiguous regions of the chunk, forming a shortened version of the chunk.

At 530, the method 500 stores the shortened version of the chunk with the single instance of the contiguous regions, replacing the span of contiguous regions.

Having described certain embodiments, numerous alternative embodiments or variations can be made. For example, although certain sizes of chunks 144 and regions 148 have been shown and described, these are merely examples, as the disclosure is not limited in this manner.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing data storage in a computerized system, the method comprising:
    beginning at a predetermined offset relative to a chunk of data received for writing, identifying a span of contiguous regions of the chunk that contain identical data;
    replacing the span of contiguous regions of the chunk with a single instance of a region of the contiguous regions; and
    persistently storing a shortened version of the chunk with the single instance replacing the span of contiguous regions,
    wherein replacing the span of contiguous regions is performed based on comparisons between adjacent pairs of regions within the chunk of data, the comparisons beginning with a pair of regions closest to the predetermined offset and proceeding until a pair of contiguous regions fails to match.

2. The method of claim 1, further comprising:
    receiving a request to read at least a portion of the chunk of data;
    detecting that the shortened version of the chunk is shorter than the chunk of data; and
    in response to said detecting, replicating the single instance of the region to reconstruct the span of contiguous regions.

3. The method of claim 2, wherein the chunk of data has a known chunk size, and wherein replicating the single instance of the region includes filling the chunk of data with multiple instances of the repeating pattern up to the chunk size.

4. The method of claim 1, wherein the predetermined offset is aligned to an ending boundary of the chunk of data.

5. The method of claim 4, wherein replacing the span of contiguous regions includes positioning the single instance of the region adjacent to a portion of the chunk of data that borders the span of contiguous regions.

6. The method of claim 1, further comprising performing the comparisons between adjacent pairs of regions based at least in part on an exclusive OR operation.

7. The method of claim 1, wherein the contiguous regions are of equal size.

8. The method of claim 1, further comprising performing compression on the shortened version of the chunk including the single instance of the region, the compression resulting in a compressed version of the chunk.

9. The method of claim 8, further comprising reconstituting the chunk, in response to receiving the compressed version of the chunk, by performing decompression on the compressed version of the chunk.

10. A computerized system, comprising control circuitry that includes a set of processing units coupled to memory, the control circuitry constructed and arranged to:
    beginning at a predetermined offset relative to a chunk of data received for writing, identify a span of contiguous regions of the chunk that contain identical data;
    replace the span of contiguous regions of the chunk with a single instance of a region of the contiguous regions; and
    persistently store a shortened version of the chunk with the single instance replacing the span of contiguous regions,
    wherein the control circuitry is further constructed and further arranged to replace the span of contiguous regions based on comparisons between adjacent pairs of regions within the chunk of data, the comparisons beginning with a pair of regions closest to the predetermined offset and proceeding until a pair of contiguous regions fails to match.

11. The system of claim 10, wherein the control circuitry is further constructed and further arranged to:
    receive a request to read at least a portion of the chunk of data;
    detect that the shortened version of the chunk is shorter than the chunk of data; and
    in response to said detecting, replicate the single instance of the region to reconstruct the span of contiguous regions.

12. The system of claim 10, wherein the predetermined offset is aligned to an ending boundary of the chunk of data.

13. The system of claim 12, wherein the control circuitry is further constructed and further arranged to replace the span of contiguous regions including positioning the single instance of the region adjacent to a portion of the chunk of data that borders the span of contiguous regions.

14. The method of claim 10, further comprising performing the comparisons between adjacent pairs of regions based at least in part on an exclusive OR operation.

15. The system of claim 10, wherein the contiguous regions are of equal size.

16. The system of claim 10, wherein the control circuitry is further constructed and further arranged to perform compression on the shortened version of the chunk including the single instance of the region, the compression resulting in a compressed version of the chunk.

17. The system of claim 16, wherein the control circuitry is further constructed and further arranged to reconstitute the chunk, in response to receiving the compressed version of the chunk, by performing decompression on the compressed version of the chunk.

18. A computer program product including a set of non-transitory, computer-readable media having instructions which, when executed by control circuitry of a computerized system, cause the control circuitry to perform a method of managing data storage, the method comprising:
    beginning at a predetermined offset relative to a chunk of data received for writing, identifying a span of contiguous regions of the chunk that contain identical data;
    replacing the span of contiguous regions of the chunk with a single instance of a region of the contiguous regions; and persistently storing a shortened version of the chunk with the single instance replacing the span of contiguous regions, wherein replacing the span of contiguous regions is performed based on comparisons between adjacent pairs of regions within the chunk of data, the comparisons beginning with a pair of regions closest to the predetermined offset and proceeding until a pair of contiguous regions fails to match.

19. The computer program product of claim 18, further comprising:

receiving a request to read at least a portion of the chunk of data;

detecting that the shortened version of the chunk is shorter than the chunk of data; and in response to said detecting, replicating the single instance of the region to reconstruct the span of contiguous regions.

* * * * *